July 14, 1970 — L. TRUXA — 3,520,775

FOIL STRUCTURE FOR PAPERMAKING MACHINE

Filed July 16, 1969

*INVENTOR.*
LESLIE TRUXA

BY

Patent Agent

United States Patent Office 3,520,775
Patented July 14, 1970

3,520,775
FOIL STRUCTURE FOR PAPERMAKING MACHINE
Leslie Truxa, 4881 Westhill Ave., Montreal, Quebec, Canada
Continuation-in-part of application Ser. No. 618,008, Feb. 23, 1967. This application July 16, 1969, Ser. No. 842,296
Int. Cl. D21f 1/48
U.S. Cl. 162—352       2 Claims

ABSTRACT OF THE DISCLOSURE

An adjustable foil for extracting water in the wet end of a paper machine incorporates a cam bar connecting the fixed portion of the foil with the other portion moveable relative thereto. The cam bar has inclined cam slots through which extend contact pins from the body of the foil, so that longitudinal movement of the cam bar changes the angle of the foil trailing surface, to control the stripping action of the foil.

DESCRIPTION OF THE INVENTION

This invention is directed to an improved foil structure for use in the wet end of a paper making machine, the application being a continuation-in-part of application Ser. No. 618,008 filed Feb. 23, 1967, now abandoned.

Adjustable foils are used in conjunction with fourdrinier wires in the wet ends of paper machines to provide controlled extraction of water from the slurry deposited upon the wire. In order to afford close control of the rate of water removal through the wire, it is necessary to provide close control of the angle of the foil trailing surface, which controls the rate of water extraction. Earlier constructions of adjustable foils have been characterized by complex control arrangements which have necessitated expensive structures that are difficult to manufacture, assemble, and maintain in operation.

The present invention provides a simplified foil structure having an improved control assembly, the cam bar or plate employed in the control assembly also serving if required as a drill template in the manufacture of the foil.

Drainage foils, which are slender elongated structures, generally in length exceeding 10 feet, may be made from plastic extrusions, having a fixed nose portion and an adjustable trailing portion resiliently attached thereto by a reduced throat section, the throat section dividing the two portions of the foil being machined subsequent to the shaping of the foil section. The fitting of the cam control to a finishing foil having the throat portion machined therein presents a number of difficulties, due to the extreme flexibility of the foil section. Accordingly the present invention provides that operations to be carried out on the foil involving the cam control are performed prior to the step of machining the throat, in order to simplify machining procedures.

The simplified structure incorporates a longitudinally slideable cam plate having a series of inclined cam slots in the thickness of the plate which engage actuating pins extending from one portion of the foil, the cam bar being slidably secured to the opposing portion of the foil and being substantially coextensive therewith in the cross-machine direction. The cam bar may be utilised as a drill template, for drilling the holes of locating and actuating pins prior to the machining of the foil throat. This provides accurate location of the pin holes so that satisfactory assembly of the foil subsequent to final machining is promoted, and inaccuracy of pin location, due to the flexibility of the final foil form is substantially avoided.

Certain embodiments of the present invention are described by way of example, reference being had to the accompanying drawings wherein.

Figure 1:
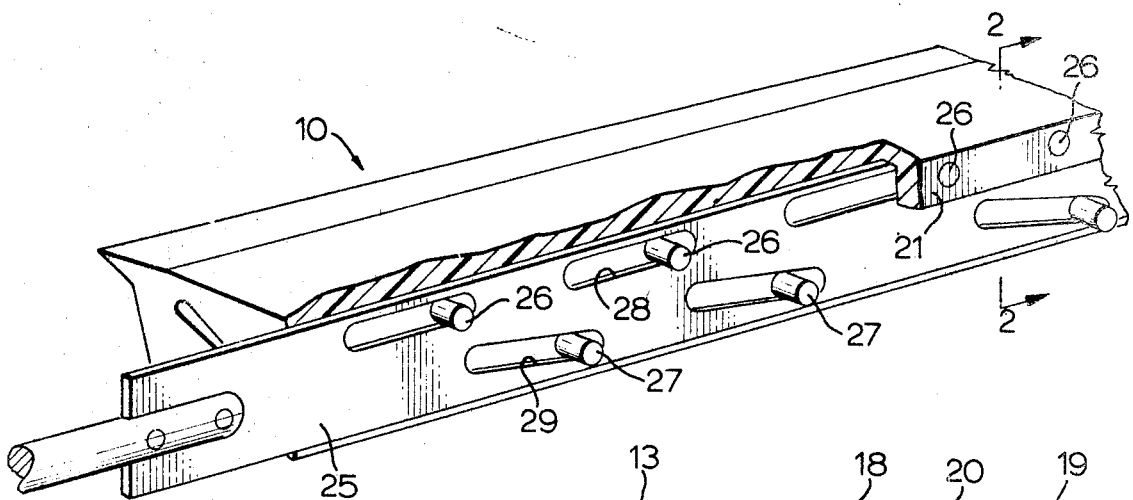
FIG. 1 is a partially sectioned general view of a foil according to the present invention.
Figure 2:
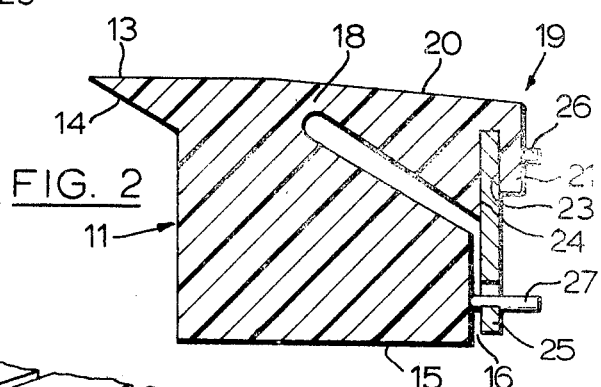
FIG. 2 is a sectioned end view of the line 2—2 of FIG. 1.

Referring to FIGS. 1 and 2, the adjustable foil 10 comprises a fixed front portion 11 having a leading nose portion with fourdrinier support surface 13 and water deflection surface 14 rearwardly and downwardly inclined therefrom. The foil 10 is provided with a lower mounting face 15 and a generally vertical back face 16. The flexible transition portion or neck 18 secures the adjustable trailing portion 19, which is of generally wedge shaped conformation having an inclinable drainage surface 20 and a rear face 21.

The foil, which may be extruded from a suitable plastic, or may be of nylon reinforced plastic material such as that trademarked "Micarta" is provided with slot walls 23, 24, forming a recess in which the cam bar or plate 25 is slidably positioned, being secured therein by means of securing pins 26. A series of cam pins 27 extending rearwardly from the foil back face 16 are received in cam slots 29 lying in the plane of the bar, the slots 29 being inclined from the main axis of the cam bar. The bar securing pins 26 operate within locating slots 28 of the bar, shown extending axially of the bar in the illustrated embodiment. The extent of the slots 28, 29, considerably exceeds the required adjustment for the foil to provide a generous allowance for slot working clearance, so that in the operation of drilling the pin holes the positioning of the pin holes relative to the ends of the slots is not critical, and the working clearance may vary appreciably from hole to hole. The two sets of multiple slots 28, 29 therefore provide a first set of mutually parallel cam slots, and a second like set.

In manufacture, before the neck 18 is formed by machining the adjacent recess to define the fixed front portion 11 and the adjustable trailing portion 19, the holes for the pins 26, 27 are provided by securing the cam plate 25 to the rear face of the extruded foil section and drilling all the required holes for the pins 26, 27. It will be evident that by locating each hole in the same position relative to its respective slot that satisfactory operation of the cam bar 25 can be assured. A corresponding drill template may be substituted if desired in this operation.

Subsequent to the drilling of the holes, the foil is then machined. Owing to the generally close fit of the cam bar 25 between the slot walls 23, 24, the back face 16 of the foil is relieved by about 1/8 of an inch, to permit backward tilting of the cam bar as the angle of declination of the foil surface 20 is increased.

The pins, particularly pins 27 are provided with a diametral clearance from the respective slot widths, to ensure absence of binding in operation, and to accommodate to the tilting of the cam bar, upon adjustment of the foil.

In order to minimize the occurrence of angular variation in the foil setting owing to differential expansion between the cam bar 25 and the body portions of the foil, the foil body portion is firmly located as by closely spaced hold down bolts, and the cam bar 25 is normally maintained in tension. This necessitates adjustment of the cam bar at both its ends, when resetting.

Figure 3:
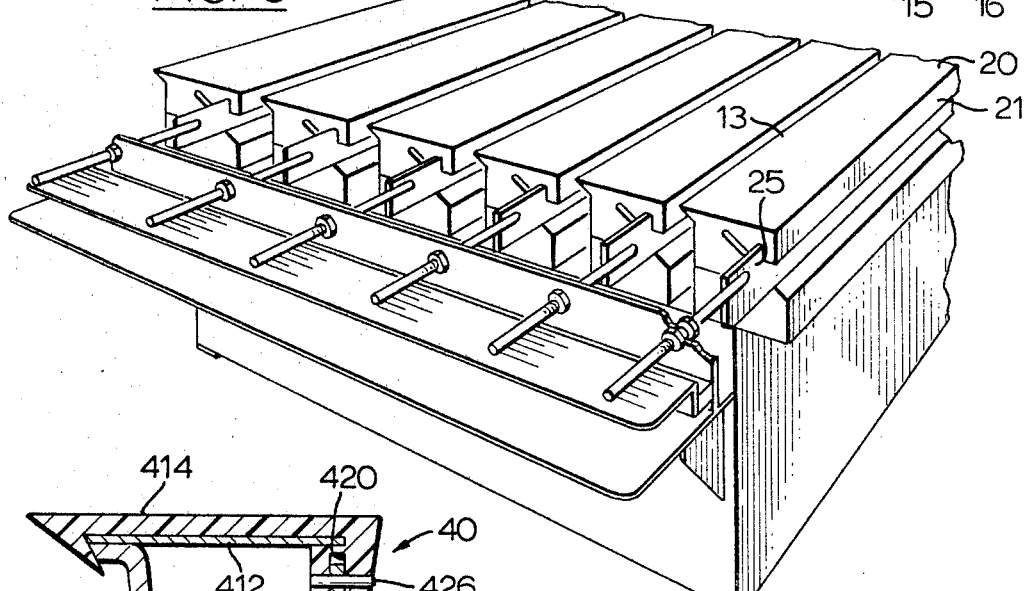
FIG. 3 illustrates a water extraction unit having a plurality of foils according to the present invention mounted thereon.

Referring to FIG. 3 it will be seen that a gang of such foils may be readily positioned in a relatively short length of the related path of a Fourdrinier wire, each foil cam bar 25 having a threaded spindle extending therefrom secured to adjacent support structure by means of locking nuts, and having a graduated index plate, illustrated as being graduated from 0 to 5 degrees, which is the usual range of the angle of declination of the foil trailing face 20 in relation to the fixed face 13, and constituting foil adjustment means to permit precise positioning of the cam bar in the cross-machine direction.

In addition, to the cost advantages provided by the improved foil structure, and the ease with which an accurate and reliable method of manufacture is provided, the present invention also provides a foil that is simple to install and easy to operate and to maintain during operation of the machine.

While the cam bar 25 has been illustrated as being a flat plate secured to the upper foil portion 19 by means of pins 26 and a surrounding slot, it will be understood that a headed pin could be substituted so as to obviate the need for providing a slot in the foil to locate the cam bar. Correspondingly, the locating pins 26 might well be obviated by providing a cam bar of T-section and a correspondingly shaped slot. Due to the considerable width of Fourdrinier machines the flat plate cam bar 25 is of elongated form.

Figure 4:
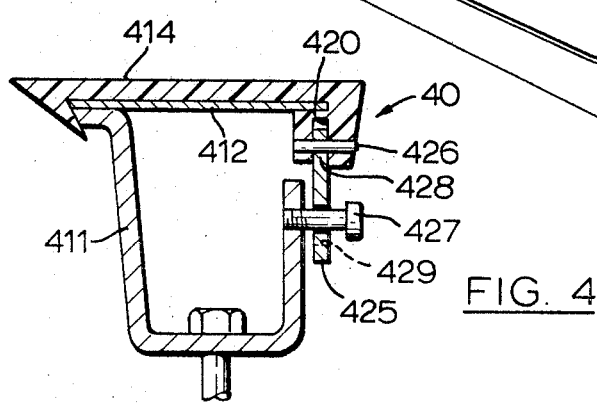
FIG. 4 is a view corresponding to FIG. 2 of a further embodiment.

In the FIG. 4 embodiment there is shown a foil main structure of prior art type, as illustrated in U.S. Pat. No. 3,140,225 of July 7, 1964, by the present inventor, having a foil 40 comprising a mounting body portion 411 having a cantilever spring portion 412 extending therefrom surmounted by the foil section 414. The control cam bar 425 according to the present invention is shown slidably mounted in slot portion 420 of the moveable section 414 by way of pins 426 extending through slots 428 in the cam bar. The inclined cam slots 429 of the cam bar 425 are engaged by pins 427 secured to the body portion 411. Axial sliding control of the bar 425 is provided similarly to that shown in FIG. 3.

It will be seen that the subject invention provides a low cost cam control of great simplicity and accuracy, which may be readily and accurately assembled with the subject foil form to provide accurate drainage control capability to the foil.

What I claim as new and desire to secure by Letters Patent of the United States is:

1. An adjustable foil structure for use in the wet end of a paper making machine having a forming wire passing over an upper surface of the foil for extraction of water by the foil downwardly from the wire, the foil structure extending in the cross-machine direction having a leading front portion to contact the wire being supported by a support structure, and a drainage surface of an adjustable trailing portion extending rearwardly in the direction of wire travel from said front portion, being variably inclined downwardly relative to the wire, a cam bar of elongated flat plate form substantially coextensive in the cross-machine direction with the foil structure, having a first set of mutually parallel cam slots extending therethrough to receive cam pin means secured to one said foil portion and a second set of mutually parallel cam slots extending therethrough to receive cam pin means secured to the other said foil portion, the slots of one said set of slots being inclined from the slots of the other said set of slots, and foil adjustment means to permit precise positioning of the cam bar in the cross-machine direction, whereby precisely controlled variation of said deflection surface may be effected to control the rate of drainage from the wire.

2. A foil structure as claimed in claim 1 wherein one said set of cam slots is inclined from the cross-machine axis of the cam bar, in the plane of the bar.

References Cited

UNITED STATES PATENTS

| 3,140,225 | 7/1964 | Truxa | 162—352 |
| 3,201,308 | 8/1965 | Goddard et al. | 162—352 |

S. LEON BASHORE, Primary Examiner

R. H. TUSHIN, Assistant Examiner

U.S. Cl. X.R.

162—374